United States Patent
Harwalkar et al.

(10) Patent No.: US 9,178,549 B2
(45) Date of Patent: Nov. 3, 2015

(54) HIGH PERFORMANCE, LOW COST RECEIVER FRONT END

(71) Applicant: Silicon Laboratories Inc., Austin, TX (US)

(72) Inventors: Navin Harwalkar, Austin, TX (US); Tim Stroud, Austin, TX (US); Dan Kasha, Seattle, WA (US)

(73) Assignee: SILICON LABORATORIES INC., Austin, TX (US)

( * ) Notice: Subject to any disclaimer, the term of this patent is extended or adjusted under 35 U.S.C. 154(b) by 17 days.

(21) Appl. No.: 14/057,404

(22) Filed: Oct. 18, 2013

(65) Prior Publication Data

US 2015/0111514 A1    Apr. 23, 2015

(51) Int. Cl.
*H04B 1/18* (2006.01)
*H04B 1/12* (2006.01)

(52) U.S. Cl.
CPC .................................... *H04B 1/123* (2013.01)

(58) Field of Classification Search
CPC ............. H04B 1/123; H04B 1/16; H04B 1/18
USPC .......... 455/73, 130, 280, 289, 341, 388, 143, 455/144, 248.1, 249.1, 253.2; 330/124 R, 330/126, 144, 147, 148
See application file for complete search history.

(56) References Cited

U.S. PATENT DOCUMENTS

| | | | |
|---|---|---|---|
| 7,081,796 B2 | 7/2006 | Krone | |
| 7,355,476 B2 | 4/2008 | Kasha et al. | |
| 7,973,603 B2 | 7/2011 | Kammula et al. | |
| 8,242,844 B2 | 8/2012 | Rafi | |
| 2003/0132814 A1* | 7/2003 | Nyberg | 333/81 R |
| 2003/0207674 A1* | 11/2003 | Hughes | 455/234.1 |
| 2007/0004359 A1* | 1/2007 | Srinivasan et al. | 455/232.1 |
| 2011/0294448 A1* | 12/2011 | Vauhkonen | 455/232.1 |

OTHER PUBLICATIONS

Avago Technologies, "A Low-Cost Surface Mount PIN Diode Pi Attenuator," Application Note 1048, Jul. 13, 2010, 8 pages.

* cited by examiner

*Primary Examiner* — Tuan Pham
(74) *Attorney, Agent, or Firm* — Polansky & Associates, P.L.L.C.; Paul J. Polansky

(57) ABSTRACT

A radio frequency (RF) receiver front end includes an RF attenuator for receiving an RF input signal and a low noise amplifier (LNA). In one form, the LNA provides a differential output signal and includes a first polarity amplifier and a plurality of second polarity amplifiers. The first polarity amplifier has an input terminal coupled to the output of the RF attenuator, an output terminal for providing a first component of the differential RF output signal, and has a first input impedance. Each of the plurality of second polarity amplifiers has an input terminal coupled to the output of said RF attenuator, and an output terminal. The output terminals of said plurality of second polarity amplifiers are coupled together and form a second component of the differential RF output signal. Each of the plurality of second polarity amplifiers has a second input impedance higher than the first input impedance.

19 Claims, 4 Drawing Sheets

HIGH PERFORMANCE, LOW COST RECEIVER FRONT END

CROSS REFEFERENCE TO RELATED, COPENDING APPLICATION

Related subject matter is found in co-pending U.S. application No. 14/625,324, filed Feb. 18, 2015, entitled "Receiver with Wide Gain Range", invented by Aslamali A. Rafi and assigned to the assignee hereof.

FIELD OF THE DISCLOSURE

The present disclosure relates generally to radio frequency (RF) receivers, and more particularly to front end circuits for RF receivers.

BACKGROUND

Wireless RF receivers are used in a wide variety of applications such as broadcast radio and television, smart metering, remote control, and the like. As used herein, a "radio frequency" signal means an electrical signal conveying useful information and having a frequency from about 3 kilohertz (kHz) to thousands of gigahertz (GHz), regardless of the medium through which such signal is conveyed. Thus an RF signal may be transmitted through air, free space, coaxial cable, fiber optic cable, etc.

An RF receiver generally receives an RF input signal from an antenna or other signal source and adjusts its gain for further processing. In a typical RF receiver front end, a signal from an antenna is input to an attenuator and the attenuator output signal is input to a low noise amplifier (LNA). The attenuator can either pass the signal through unattenuated or apply an attenuation. The attenuator provides proper input impedance to match the source impedance of the antenna for optimum power transfer while also providing appropriate output impedance as seen from the input of the LNA. The LNA then typically converts its single-ended input signal to a differential output signal in order to enable downstream stages to process the signal with better noise and distortion performance.

In one typical LNA configuration, two amplifiers are used to convert a single-ended input signal to a differential output signal; one amplifier generates the positive output and the other generates the negative output. In this configuration, one amplifier has relatively low input impedance to match the output impedance of the attenuator, while the other amplifier has relatively high input impedance but can be used to cancel the noise and distortion introduced by the first amplifier by making the noise and distortion common-mode at the output of the LNA. However in this configuration, the noise and distortion introduced by the second amplifier itself are not cancelled, which limits the overall performance of the LNA.

BRIEF DESCRIPTION OF THE DRAWINGS

The present disclosure may be better understood, and its numerous features and advantages made apparent to those skilled in the art by referencing the accompanying drawings, in which.

In the following description, the use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
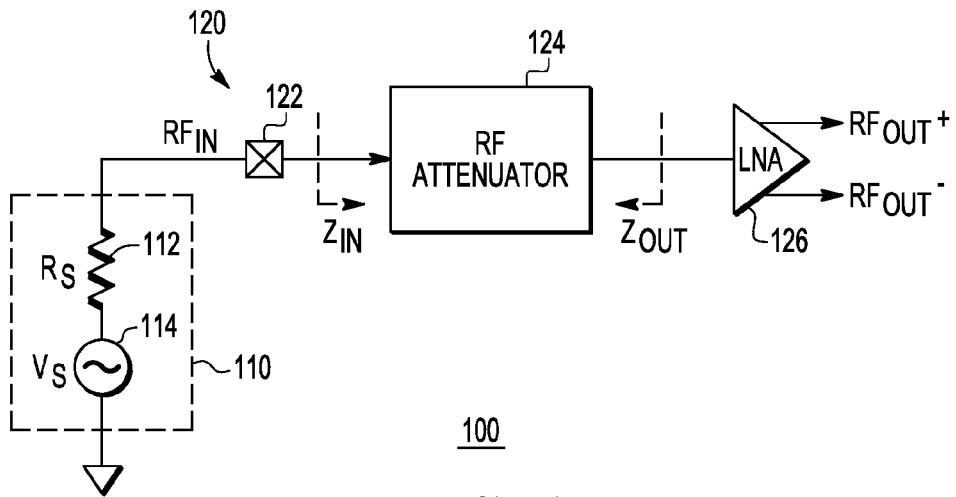
FIG. 1 illustrates in partial block diagram and partial schematic form a radio frequency (RF) receiver having a front end.

FIG. 1 illustrates in partial block diagram and partial schematic a radio frequency (RF) receiver 100 having a front end 120. RF receiver 100 has an antenna 110 connected to receiver front end 120. Antenna 110 is modeled as a voltage source 114 labeled "$V_S$" having one terminal connected to ground and another terminal connected in series with a source resistor 112 having a resistance labeled "$R_S$" by which it provides an RF input signal labeled "$RF_{IN}$" to front end 120. Front end 120 includes a bonding pad 122, an RF attenuator 124, and a low noise amplifier (LNA) 126. Bonding pad 122 serves as an interconnection point between antenna 110 and an integrated circuit on which front end 120 is constructed for receiving signal $RF_{IN}$. RF attenuator 124 has an input connected to bonding pad 122, and an output. LNA 126 has an input connected to the output of RF attenuator 124, and an output for providing a differential signal having a positive component labeled "$RF_{OUT}^+$" and a negative component labeled "$RF_{OUT}^-$".

In operation, front end 120 serves as an interface between antenna 110 and other receiver circuits disposed on the integrated circuit, such as mixers, filters, gain elements, demodulators, and the like. It is important for RF attenuator 124 to provide a wide attenuation range while maintaining constant input and output impedances, labeled "$Z_{IN}$" and "$Z_{OUT}$", respectively. For example, $Z_{IN}$ could be 50Ω or 75Ω or any other suitable impedance, and is preferably closely matched to $R_S$. LNA 126 converts the single-ended, attenuated $RF_{IN}$ signal into a differential signal formed by signals $RF_{OUT}^+$ and $RF_{OUT}^-$. In general, differential signaling has advantages for processing in receiver 100.

In various embodiments, the $RF_{IN}$ signal could be a broadcast radio signal, a broadcast television signal, a modulated data signal, etc. In receiver 100, bonding pad 122, RF attenuator 124, and LNA 126 are all combined on a single integrated circuit to reduce system cost, but in other embodiments could be implemented as discrete components or with multiple integrated circuits.

Figure 2:
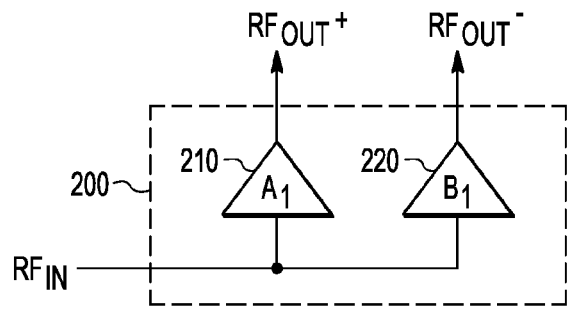
FIG. 2 illustrates in block diagram form a low noise amplifier (LNA) known in the prior art.

FIG. 2 illustrates in block diagram form a low noise amplifier (LNA) 200 known in the prior art. LNA 200 includes a non-inverting amplifier 210 and a second, inverting amplifier 220. Amplifier 210 has an input terminal for receiving the $RF_{IN}$ signal, and an output terminal for providing $RF_{OUT}^+$, and is labeled "$A_1$". Amplifier 220 has an input terminal for receiving the $RF_{IN}$ signal, and an output terminal for providing $RF_{OUT}^-$, and is labeled "$B_1$".

LNA 200 is implemented using two individual amplifiers 210 and 220. Amplifier 210 provides input termination such as 50Ω or 75Ω, or any other suitable impedance to match $Z_{OUT}$. Amplifier 220, however, has a relatively high input impedance and serves as a noise and distortion canceling path because it can be sized to cancel the noise and distortion of amplifier 210. This cancellation occurs because the noise and distortion of amplifier 210 appear in equal magnitude and in phase at $RF_{OUT}^+$ and $RF_{OUT}^-$, and when the output is viewed differentially, the noise and distortion cancel. However the noise and distortion introduced by amplifier 220 itself do not cancel, which limits the noise and distortion performance of the LNA.

Figure 3:
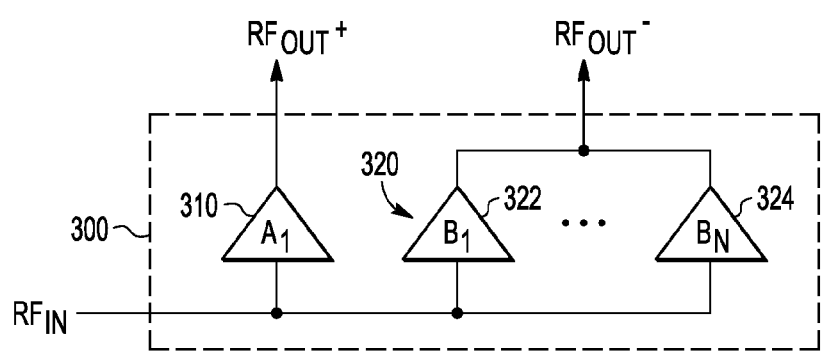
FIG. 3 illustrates in block diagram form an LNA for use in the RF receiver of FIG. 1 according to one embodiment.

FIG. 3 illustrates in block diagram form an LNA 300 for use in RF receiver 100 of FIG. 1 according to one embodiment. LNA 300 includes a first polarity amplifier 310 and a set of second polarity amplifiers 320. First polarity amplifier 310 is labeled "$A_1$" and has an input terminal for receiving the $RF_{IN}$ signal, and an output terminal for providing signal $RF_{OUT}^+$. Second polarity amplifiers 320 include N amplifiers, in which N is an integer greater than or equal to two, such as a first second polarity amplifier 322 labeled "$B_1$", and a representative $N^{th}$ second polarity amplifier 324 labeled "$B_N$". Each second polarity amplifier has an input for receiving the $RF_{IN}$ signal, and an output connected to outputs of other second polarity amplifiers for providing signal $RF_{OUT}^-$.

Second polarity amplifiers 320 are designed such that their combination continues to provide a noise and distortion cancellation path for amplifier 310. For the case of N=2, the parameters of amplifiers 322 and 324 can be chosen such that a specific distortion term also cancels between amplifier 322 and 324. For example, amplifiers 322 and 324 can be designed such that the second- (and all other even-) order distortion products of devices in amplifiers 322 and 324 cancel. Alternatively, amplifiers 322 and 324 can be designed such that the third- (and all other odd-) order distortion products of devices in amplifiers 322 and 324 cancel. In general, a specific and selectable distortion product of all amplifiers 310, 322, and 324 can be cancelled at the output of LNA 300.

For the case of N>2, the parallel combination of amplifiers $B_1$ through $B_N$ is sized and designed in such a way that it provides a noise and distortion cancellation path for amplifier 310. For N>2, each second polarity amplifier can be designed to cancel the second, third, or both distortion products of the other second polarity amplifiers. Thus the additional second polarity amplifiers provide extra degrees of freedom for noise and distortion cancellation.

Figure 4:
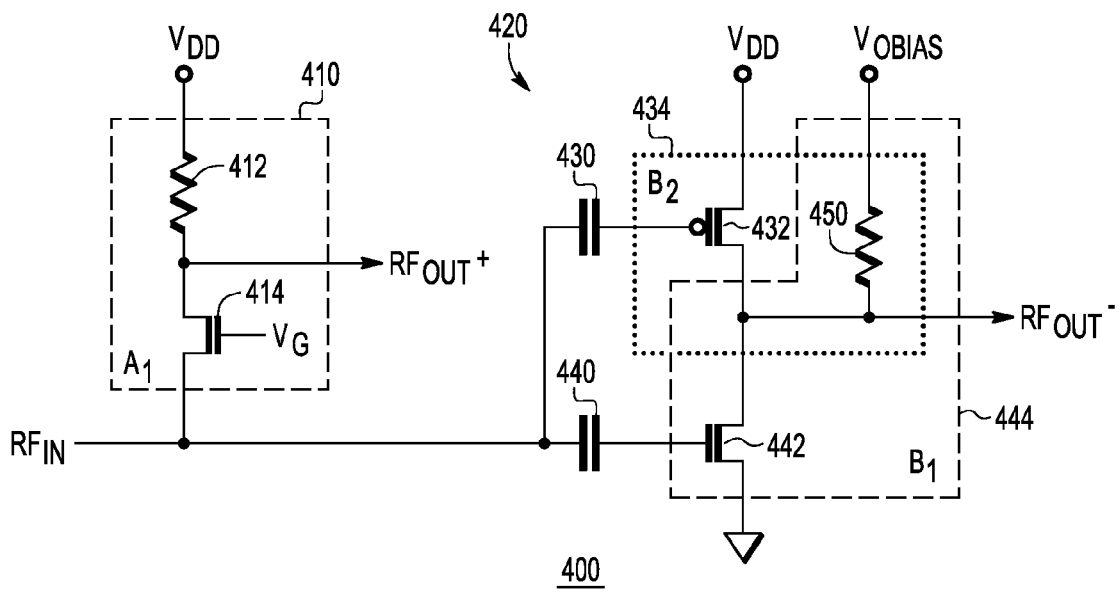
FIG. 4 illustrates in schematic form an LNA corresponding to the LNA of FIG. 3 for N=2.

FIG. 4 illustrates in schematic form an LNA 400 corresponding to LNA 300 of FIG. 3 for N=2. LNA 400 includes generally a first polarity amplifier 410 labeled "$A_1$" and a set of two second polarity amplifiers 420 labeled "$B_1$" and "$B_2$", respectively. First polarity amplifier 410 includes a resistor 412 and an N-channel metal-oxide-semiconductor (MOS) transistor 414. Resistor 412 has a first terminal connected to a power supply voltage terminal labeled "$V_{DD}$", and a second terminal for providing signal $RF_{OUT}^+$. $V_{DD}$ is a more positive power supply voltage terminal having a nominal voltage of, for example, 3.0 volts. Transistor 414 has a drain connected to the second terminal of resistor 412, a gate for receiving a bias voltage labeled "$V_G$", and a source for receiving the $RF_{IN}$ signal.

Second polarity amplifiers 420 include a capacitor 430, a P-channel MOS transistor 432, a capacitor 440, an N-channel transistor 442, and a resistor 450. Capacitor 430 has a first terminal for receiving the $RF_{IN}$ signal, and a second terminal. Transistor 432 has a source connected to $V_{DD}$, a gate connected to the second terminal of capacitor 430, and a drain for providing signal $RF_{OUT}^-$. Capacitor 440 has a first terminal for receiving the $RF_{IN}$ signal, and a second terminal. Transistor 442 has a drain connected to the drain of transistor 432, a gate connected to the second terminal of capacitor 440, and a source connected to a ground power supply voltage terminal having a nominal voltage of, for example, zero volts. Resistor 450 has a first terminal for receiving a bias voltage labeled $V_{OBIAS}$, and a second terminal connected to the drains of transistors 432 and 442.

In operation, $V_G$ is set to a voltage below $V_{DD}$ to bias transistor 414 in first polarity amplifier 410 in the appropriate region (for example, in the saturation region) to provide voltage amplification between $RF_{IN}$ and $RF_{OUT}^+$. First polarity amplifier 410 also sets the input impedance of LNA 400 to match the output impedance of attenuator 124. In LNA 400, first polarity amplifier 410 is a common gate amplifier that requires a DC current path. However several other amplifier types also require a DC current path, such as common drain, series and shunt feedback, etc. LNA 400 is formed on an integrated circuit that provides a DC path between $V_{DD}$ and ground to properly bias transistor 414 in a manner that will be described further below.

Second polarity amplifiers 420 include two amplifiers $B_1$ and $B_2$ in which amplifier $B_1$ includes transistor 442 and resistor 450, and amplifier $B_2$ includes transistor 432 and resistor 450. Thus resistor 450 is shared between amplifiers $B_1$ and $B_2$. Capacitors 430 and 440 are used as DC filters. Moreover because the input impedance of MOS transistors is very high compared to $R_S$, the effect of the input impedance of $B_1$ and $B_2$ on the overall input impedance is negligible.

In the example shown in FIG. 4, amplifiers $B_1$ and $B_2$ cancel the second order distortion of amplifier $A_1$, and the second order distortion products of amplifiers $B_1$ and $B_2$ cancel each other. Overall, LNA 400 has very good second order distortion performance measured by, for example, the second-order input intercept point (IIP2). The noise of transistor 414 is cancelled by amplifiers $B_1$ and $B_2$. In addition, the arrangement of amplifiers $B_1$ and $B_2$ also results in very low noise for a given power consumption, resulting in very good overall noise performance for LNA 400.

Figure 5:
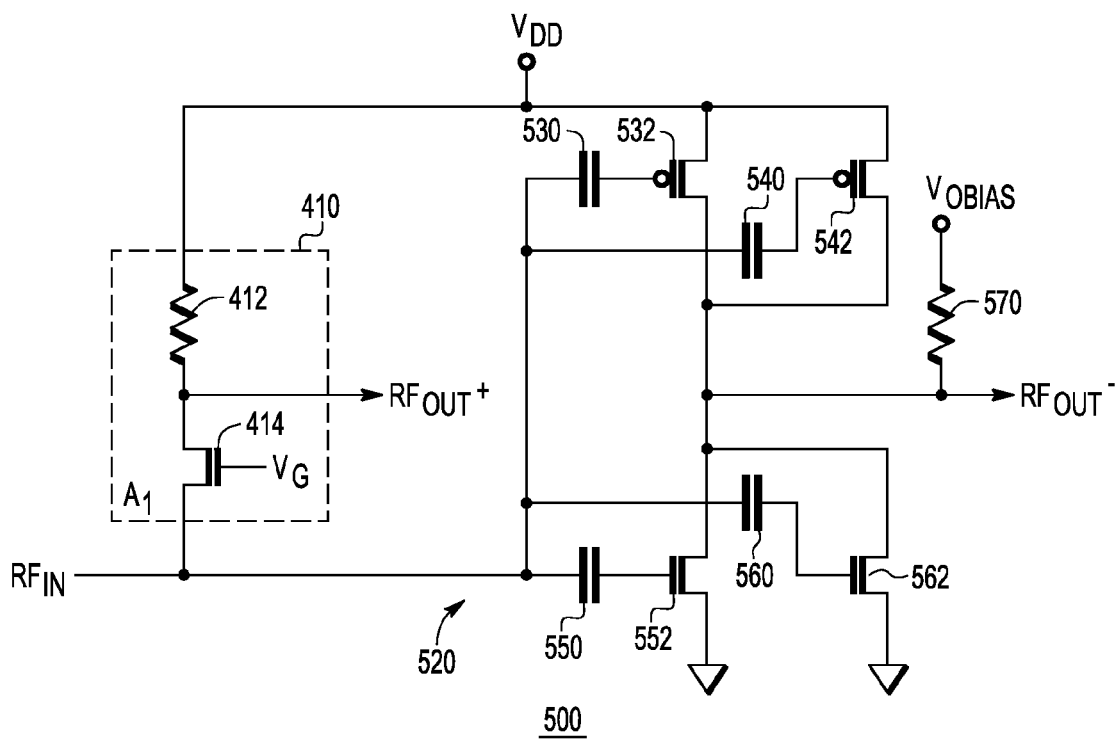
FIG. 5 illustrates in schematic form an LNA corresponding to the LNA of FIG. 3 for N=4.

FIG. 5 illustrates in schematic form an LNA 500 corresponding to LNA 300 of FIG. 3 for N=4. LNA 500 includes a first polarity amplifier 410 and a set of second polarity amplifiers 520. First polarity amplifier 410 is labeled "A1" and is constructed the same as amplifier 410 of FIG. 4 and labeled the same.

Set of second polarity amplifiers 520 includes a capacitor 530, a P-channel MOS transistor 532, a capacitor 540, a P-channel MOS transistor 542, a capacitor 550, an N-channel MOS transistor 552, a capacitor 560, an N-channel MOS transistor 562, and a resistor 570. Capacitor 530 has a first terminal for receiving the $RF_{IN}$ signal, and a second terminal. Transistor 532 has a source connected to $V_{DD}$, a gate connected to the second terminal of capacitor 530, and a drain for providing signal $RF_{OUT}^-$. Capacitor 540 has a first terminal for receiving the $RF_{IN}$ signal, and a second terminal. Transistor 542 has a source connected to $V_{DD}$, a gate connected to the second terminal of capacitor 540, and a drain connected to the drain of transistor 532. Capacitor 550 has a first terminal for receiving the $RF_{IN}$ signal, and a second terminal. Transistor 552 has a drain connected to the drains of transistors 532 and 542, a gate connected to the second terminal of capacitor 550, and a source connected to ground. Capacitor 560 has a first terminal for receiving the $RF_{IN}$ signal, and a second terminal. Transistor 562 has a drain connected to the drains of transistors 532 and 542, a gate connected to the second terminal of capacitor 560, and a source connected to ground. Resistor 570 has a first terminal for receiving signal $V_{OBIAS}$, and a second terminal connected to the drains of transistors 532, 542, 552, and 562.

LNA 500 includes four second polarity amplifiers including an amplifier B1 including transistor 532 and resistor 570, an amplifier B2 including transistor 542 and resistor 570, an amplifier B3 including transistor 552 and resistor 570, and an amplifier B4 including transistor 562 and resistor 570. Resistor 570 is shared between amplifiers B1-B4. In the example shown in FIG. 5, amplifiers $B_1$-$B_4$ cancel the second and third order distortion of amplifier $A_1$. The second order distortion of amplifiers $B_1$ and $B_2$ cancels that of amplifiers $B_3$ and $B_4$. In addition, amplifier $B_1$ cancels the third order distortion product of amplifier $B_2$, and amplifier $B_3$ cancels the third order distortion product of amplifier $B_4$. In summary, both second and third order distortion products of all transistors are cancelled and LNA 500 has very good second and third order distortion performance. The noise of transistor 414 is cancelled by amplifiers $B_1$-$B_4$. In addition, the arrangement of amplifiers $B_1$-$B_4$ also results in very low noise for a given power consumption, resulting in very good overall noise performance for LNA 500.

Figure 6:
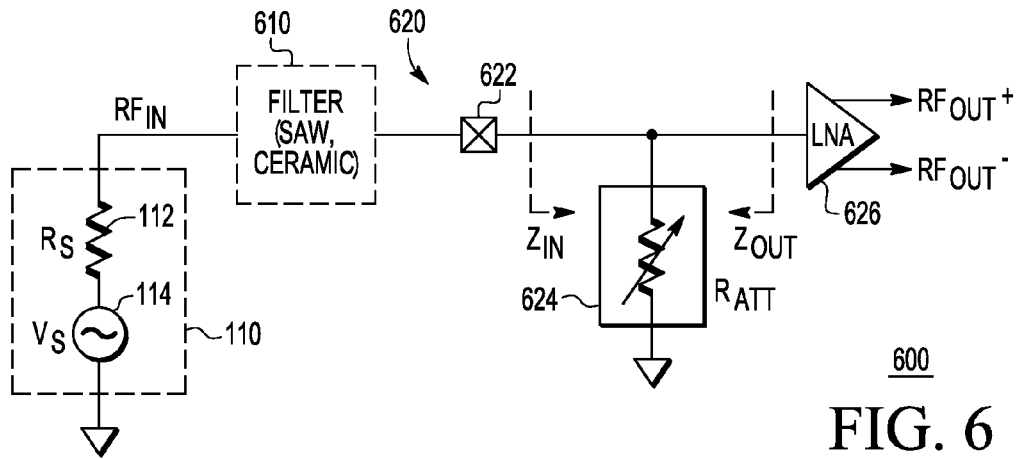
FIG. 6 illustrates in partial block diagram and partial schematic form an RF receiver using a first attenuator known in the prior art.

FIG. 6 illustrates in partial block diagram and partial schematic form an RF receiver 600 using a first attenuator 624 known in the prior art. RF receiver 600 has an antenna 110 as described with respect to FIG. 1 above connected to a front end 620 through an optional external filter 610. Front end 620 includes a bonding pad 622, an RF attenuator 624, and a low noise amplifier (LNA) 626. Bonding pad 622 serves as an interconnection point between antenna 110 and an integrated circuit on which front end 620 is constructed for receiving the $RF_{IN}$ signal. RF attenuator 624 has an input connected to bonding pad 622, a control input, and an output. LNA 626 has an input connected to the output of RF attenuator 124, and an output for providing a differential signal having a positive component $RF_{OUT}^+$ and a negative component $RF_{OUT}^-$.

In operation, filter 610 can be implemented using a known filter architecture such as a surface acoustic wave (SAW), ceramic, etc. Attenuator 624 is a variable shunt attenuator to provide input attenuation. However it has an attenuation range limited by the smallest practically realizable value of $R_{ATT}$. Moreover, it provides no input matching, which can create problems for off-chip filter 610. It also does not provide output matching which can create problems for LNA 626 because noise and distortion cancellation mechanisms in LNA 626 only work well when LNA 626 sees a constant impedance looking back toward the source, i.e. $Z_{OUT}$, which is usually 50Ω or 75Ω or the like.

Figure 7:
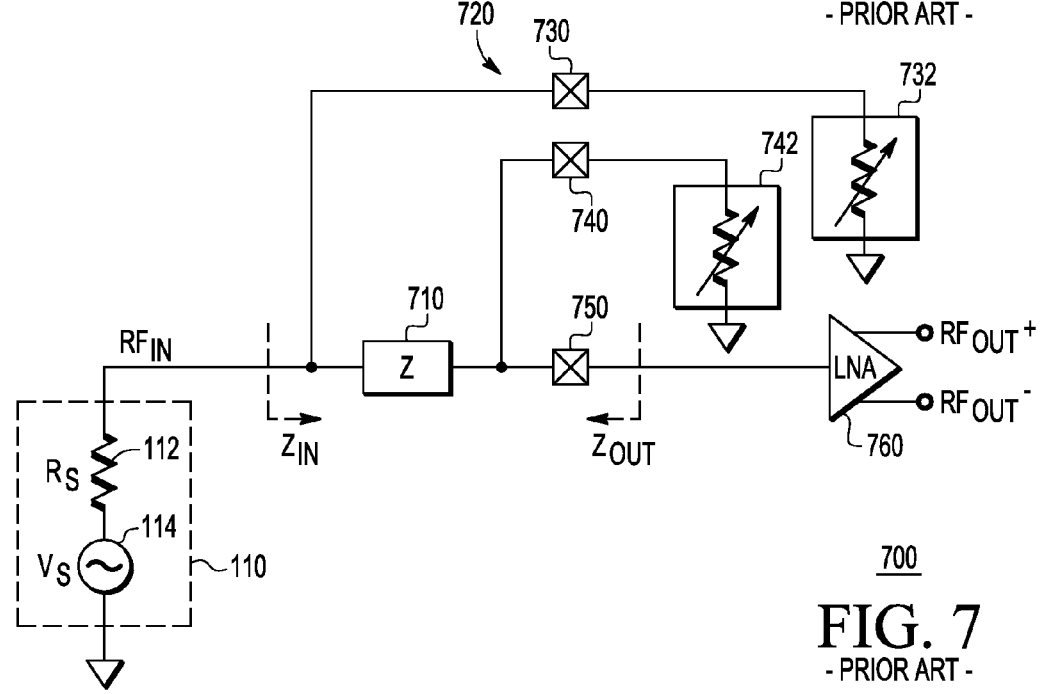
FIG. 7 illustrates in partial block diagram and partial schematic form an RF receiver using a second attenuator known in the prior art.

FIG. 7 illustrates in partial block diagram and partial schematic form an RF receiver 700 using a second attenuator known in the prior art. RF receiver 700 has an antenna 110 as described with respect to FIG. 1 above connected to an external impedance 710. External impedance 710 has a first terminal for receiving signal $RF_{IN}$, and a second terminal. A front end 720 includes bonding pads 730, 740, and 750, variable resistors 732 and 742, and an LNA 760. Bonding pad 730 receives signal $RF_{IN}$. Variable resistor 732 has a first terminal connected to bonding pad 730, a control terminal, and a second terminal connected to ground. Bonding pad 740 is connected to the second terminal of external impedance 710. Variable resistor 742 has a first terminal connected to bonding pad 740, a control terminal, and a second terminal connected to ground. Bonding pad 750 is also connected to the second terminal of external impedance 710. LNA 760 has an input connected to bonding pad 750, and an output providing a differential signal having a positive component $RF_{OUT}^+$ and a negative component $RF_{OUT}^-$.

The attenuator of FIG. 7 uses external impedance 710 and two (or more) on-chip variable resistors 732 and 742 to accomplish wide range RF attenuation. However the attenuator requires two extra integrated circuit pins 730 and 740, increasing cost. Moreover while providing wider attenuation range than variable resistor 624 of FIG. 6, it still does not maintain either a constant input impedance ($Z_{IN}$) or a constant output impedance ($Z_{OUT}$). Therefore, this attenuator is still incompatible with off-chip filters (610) and with noise and distortion canceling LNAs (300, 400, 500.)

Figure 8:
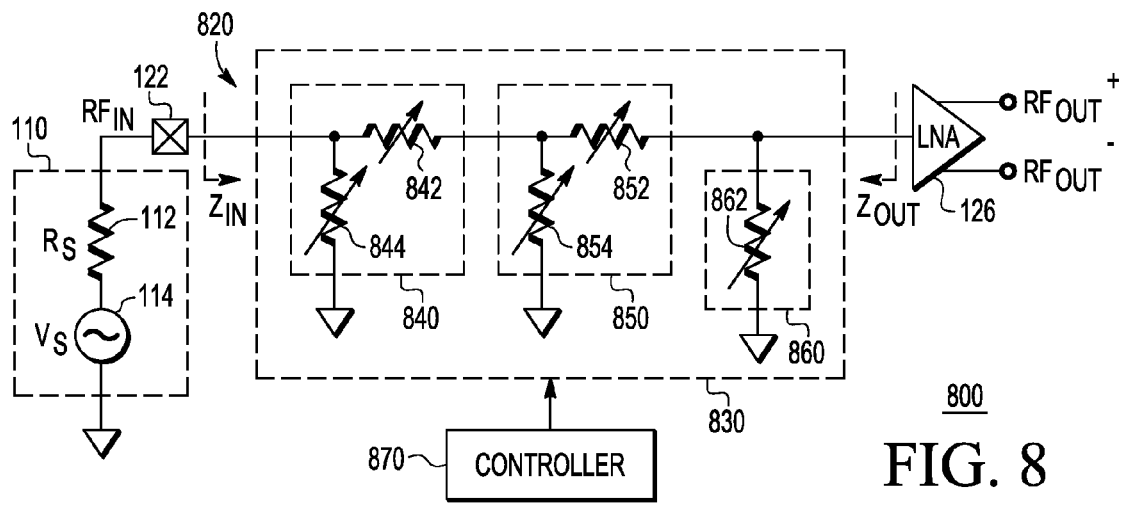
FIG. 8 illustrates in partial block diagram and partial schematic form an RF receiver having an attenuator according to one embodiment.

FIG. 8 illustrates in partial block diagram and partial schematic form an RF receiver 800 having an attenuator 830 according to one embodiment. RF receiver 800 has an antenna 110 as described with respect to FIG. 1 above connected to a front end 820. Front end 820 includes bonding pad 122, an RF attenuator 830, and LNA 126. RF attenuator 830 generally includes variable attenuators 840, 850, and 860 and a controller 870. Variable attenuator 840 includes a variable resistor 842 and a variable resistor 844. Variable resistor 842 has a first terminal for receiving the $RF_{IN}$ signal, a second terminal, and a control terminal. Variable resistor 844 has a first terminal connected to the first terminal of variable resistor 842 for receiving the $RF_{IN}$ signal, a second terminal connected to ground, and a control terminal. Variable attenuator 850 includes a variable resistor 852 and a variable resistor 854. Variable resistor 852 has a first terminal connected to the second terminal of variable resistor 842, a second terminal connected to ground, and a control terminal. Variable resistor 854 has a first terminal connected to the first terminal of variable resistor 852 and to the second terminal of variable resistor 842, a second terminal connected to ground, and a control terminal. Variable attenuator 860 includes a variable resistor 862. Variable resistor 862 has a first terminal connected to the second terminal of variable resistor 852, a control terminal, and a second terminal connected to ground. Controller 870 has outputs connected to the control inputs of variable resistors 842, 844, 852, 854, and 862. LNA 126 has an input connected to the output of RF attenuator 830, and an output for providing a differential signal having a positive component $RF_{OUT}^+$ and negative component $RF_{OUT}^-$.

Attenuator 830 uses two variable attenuators 840 and 850 in addition to a variable shunt resistor 862. Controller 870 varies the values of variable resistors 842, 844, 852, 854, and 862 in concert to provide substantially constant input impedance ($Z_{IN}$), substantially constant impedance at the input of LNA 126 ($Z_{OUT}$), and wide attenuation range using only a single integrated circuit terminal. This allows the receiver to be compatible with a wide range of off-chip filters (SAW, ceramic, etc.) and also makes it possible to combine attenuator 830 with an LNA as described above without compromising its noise and distortion cancellation properties. Thus attenuator 830 is well suited for use with LNAs 300, 400, and 500.

Figure 9:
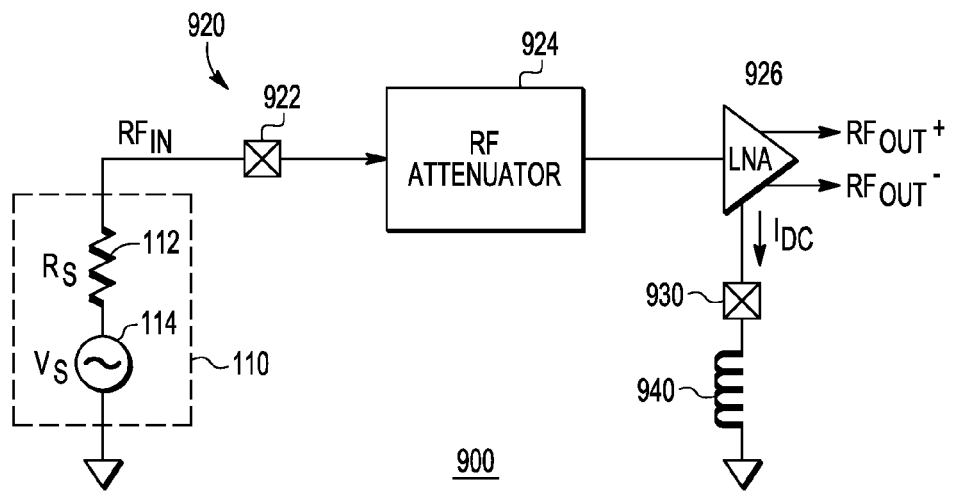
FIG. 9 illustrates in partial block diagram and partial schematic form an RF receiver having a front end with a direct current (DC) current path known in the prior art.

FIG. 9 illustrates in partial block diagram and partial schematic form an RF receiver 900 having a front end 920 with a direct current (DC) path known in the prior art. RF receiver 900 has an antenna 110 as described with respect to FIG. 1 above connected to a front end 920. Front end 920 includes a bonding pad 922, an RF attenuator 924, and an LNA 926. LNA 926 includes, for example, a first polarity amplifier A1 and one or more second polarity amplifiers B1 etc. Since amplifier A1 requires a DC bias, front end 920 also includes a bonding pad 930 and inductor 940 to source a DC current labeled "$I_{DC}$". Inductor 940 forms a high impedance to ground at signal frequencies to ensure that no desired signal content is shunted to ground. While front end 920 provides an adequate DC path for amplifier A1, it requires an extra integrated circuit pin 930, which increases system cost.

Figure 10:
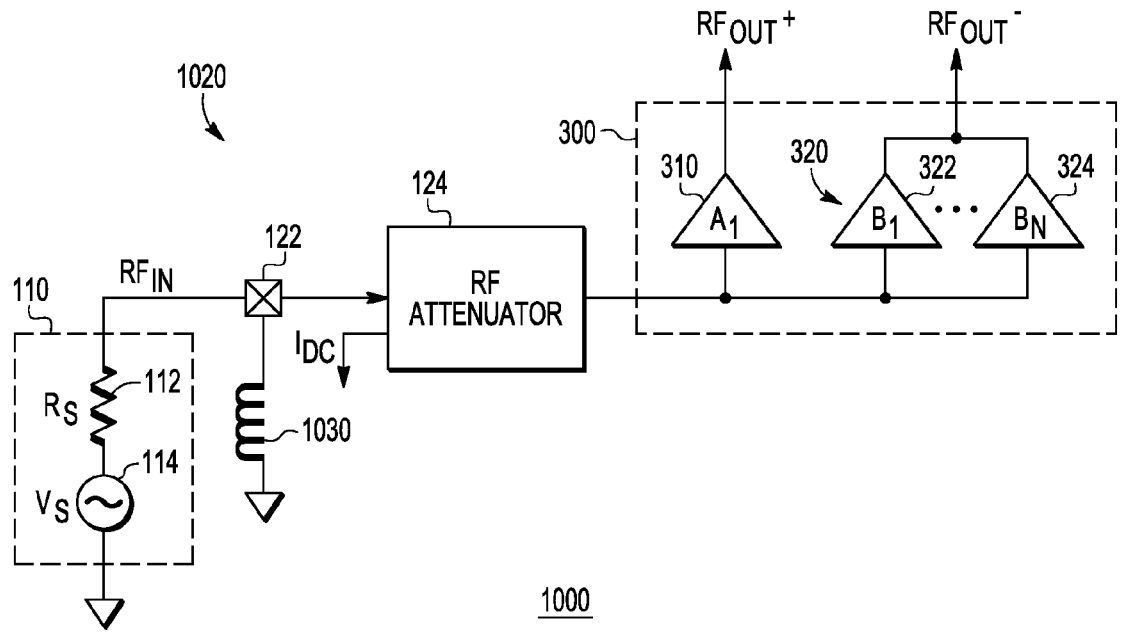
FIG. 10 illustrates in partial block diagram and partial schematic form an RF receiver having a front end using the RF attenuator of FIG. 8 and the LNA of FIG. 3 according to another embodiment.

FIG. 10 illustrates in partial block diagram and partial schematic form an RF receiver 1000 having a front end 1020 using RF attenuator 830 of FIG. 8 and LNA 300 of FIG. 3 according to another embodiment. RF receiver 1000 includes antenna 110 as described with respect to FIG. 1 above connected to a receiver front end 1020. Front end 1020 includes bonding pad 122 and an inductor 1030 connected between bonding pad 122 and ground. Front end 1020 allows the DC bias current of amplifier 310 ($I_{DC}$) to flow though RF attenuator 830, through bonding pad 122 and inductor 1030 to ground. By incorporating a DC path through attenuator 124 and bonding pad 122 to ground, front end 1020 saves an integrated circuit device pin. Note that inductor 1030 can be formed on-chip, or can be contained on-package or external to the integrated circuit package, thus allowing for flexible configuration and additional cost savings for manufacturing processes that either allow for high-valued on-chip inductors or discrete component integration on-package.

The above-disclosed subject matter is to be considered illustrative, and not restrictive, and the appended claims are intended to cover all such modifications, enhancements, and other embodiments that fall within the true scope of the claims. For example, a receiver front end as described in various embodiments above can be used with a variety of receiver architectures including up-down, direct down conversion, quadrature mixing, etc. In various embodiments, different first polarity architectures can be used. Moreover, the value of N can be varied in accordance with system performance-cost tradeoffs. In various embodiments, attenuator 830 and LNA 300 can be used separately or in combination, and if used in combination the front end can further provide a DC current path through the $RF_{IN}$ bonding pad, with an internal or external inductor.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A radio frequency (RF) receiver front end, comprising:
an RF attenuator having an input for receiving an RF input signal, and an output; and
a low noise amplifier (LNA) having an input coupled to said output of said RF attenuator, and an output for providing a differential RF output signal,
wherein said LNA comprises:
a first polarity amplifier having an input terminal coupled to said output of said RF attenuator, and an output terminal for providing a first component of said differential RF output signal, said first polarity amplifier having a first input impedance; and
a plurality of second polarity amplifiers, each having an input terminal coupled to said output of said RF attenuator, and an output terminal, wherein said output terminals of said plurality of second polarity amplifiers are coupled together and form a second component of said differential RF output signal, and each of said plurality of second polarity amplifiers has a second input impedance higher than said first input impedance.

2. The RF receiver front end of claim 1, wherein said first input impedance substantially matches an impedance of a signal source providing said RF input signal.

3. The RF receiver front end of claim 1, wherein said first polarity amplifier comprises a non-inverting amplifier.

4. The RF receiver front end of claim 3, wherein said non-inverting amplifier comprises:
a resistor having first terminal coupled to a power supply voltage terminal, and a second terminal for providing positive component of said differential RF output signal; and
a transistor having a first current electrode coupled to said second terminal of said resistor, a gate for receiving a gate bias voltage, and a second current electrode coupled to said output of said RF attenuator.

5. The RF receiver front end of claim 1, wherein said plurality of second polarity amplifiers comprises two inverting amplifiers.

6. The RF receiver front end of claim 5, wherein said plurality of second polarity amplifiers comprises:
a first transistor having first current electrode coupled to a first power supply voltage terminal, an input electrode coupled to said output of said attenuator, and a second current electrode; and
a second transistor having first current electrode coupled to said second current electrode of said first transistor, an input electrode coupled to said output of said RF attenuator, and a second current electrode coupled to a second power supply voltage terminal; and
a resistor having a first terminal for receiving a bias voltage, and a second terminal forming said second component of said differential RF output signal and coupled to said second current electrode of said first transistor and to said first current electrode of said second transistor.

7. The RF receiver front end of claim 6, further comprising first and second capacitors coupled between said output of said attenuator and said input electrodes of said first and second transistors, respectively.

8. The RF receiver front end of claim 1, wherein said plurality of second polarity amplifiers comprises four amplifiers.

9. The RF receiver front end of claim 8, wherein said plurality of second polarity amplifiers comprises:
a first transistor having first current electrode coupled to a first power supply voltage terminal, an input electrode coupled to said output of said RF attenuator, and a second current electrode; and
a second transistor having first current electrode coupled to said first power supply voltage terminal, an input electrode coupled to said output of said RF attenuator, and a second current electrode coupled to said second current electrode of said first transistor; and
a third transistor having first current electrode coupled to said second current electrodes of said first and second transistors, an input electrode coupled to said output of said RF attenuator, and a second current electrode coupled to a second power supply voltage terminal;
a fourth transistor having first current electrode coupled to said second current electrodes of said first and second transistors, an input electrode coupled to said output of said RF attenuator, and a second current electrode coupled to said second power supply voltage terminal; and a resistor having a first terminal for receiving a bias voltage, and a second terminal forming said second component of said differential RF output signal and coupled to said second current electrodes of said first and second transistors and to said first current electrodes of said third and fourth transistors.

10. The RF receiver front end of claim 9, further comprising first, second, third, and fourth capacitors coupled between said output of said RF attenuator and said input electrodes of said first, second, third, and fourth transistors, respectively.

11. The RF receiver front end of claim 1, wherein said RF attenuator comprises:

a first variable attenuator having an input terminal for receiving said RF input signal, an output terminal, and a control input terminal for receiving a first control signal;

a second variable attenuator having an input terminal coupled to said output terminal of said first variable attenuator, an output terminal coupled to said input of said LNA, and a control input terminal for receiving a second control signal; and a shunt attenuator having first terminal coupled to said output terminal of said second variable attenuator, a second terminal coupled to a power supply voltage terminal, and a control input terminal for receiving a third control signal.

12. The RF receiver front end of claim 11, wherein said first variable attenuator comprises:

a first variable resistor having a first terminal forming said input terminal of said first variable attenuator, a second terminal forming said output terminal of said first variable attenuator, and a control input terminal for receiving said first control signal; and a second variable resistor having a first terminal coupled to said first terminal of said first variable resistor, a second terminal coupled to said power supply voltage terminal, and a control input terminal for receiving said first control signal.

13. The RF receiver front end of claim 11, wherein said second variable attenuator comprises:

a first variable resistor having a first terminal forming said input terminal of said second variable attenuator, a second terminal forming said output terminal of said second variable attenuator, and a control input terminal for receiving said second control signal; and a second variable resistor having a first terminal coupled to said first terminal of said first variable resistor, a second terminal coupled to said power supply voltage terminal, and a control input terminal for receiving said second control signal.

14. The RF receiver front end of claim 11, wherein said shunt attenuator comprises:

a variable resistor having a first terminal coupled to said output terminal of said second variable attenuator, a second terminal coupled to said power supply voltage terminal, and a control input terminal for receiving said third control signal.

15. The RF receiver front end of claim 11, further comprising:

a controller for providing said first, second, and third control signals.

16. A radio frequency (RF) receiver, comprising:

a bonding pad for receiving an RF input signal;

an RF attenuator having an input coupled to said bonding pad, and an output; and a low noise amplifier having an input coupled to said output of said RF attenuator, and an output for providing a differential RF output signal, wherein said LNA comprises:

a first polarity amplifier having an input terminal coupled to said output of said RF attenuator, and an output for providing a first component of said differential RF output signal; and a second polarity amplifier having an input terminal coupled to said output of said RF attenuator, and an output terminal for providing a second component of said differential RF output signal, and an inductor having a first terminal coupled to said bonding pad, and a second terminal coupled to a power supply voltage terminal, wherein said inductor is coupled between said bonding pad and said power supply voltage terminal so as to provide a direct current (DC) path from said first polarity amplifier through said RF attenuator and through said bonding pad to said power supply voltage terminal.

17. The RF receiver of claim 16, wherein said inductor is integrated with said bonding pad, said RF attenuator, and said LNA on a single integrated circuit chip.

18. The RF receiver of claim 16, wherein said bonding pad, said RF attenuator, and said LNA are combined on a single integrated circuit chip, and said inductor is external to said single integrated circuit chip.

19. The RF receiver of claim 16, wherein said first polarity amplifier has a direct current (DC) path through said RF attenuator, said bonding pad, and said inductor, and said second polarity amplifier comprises a plurality of second polarity amplifiers having output terminals coupled together to form said second component of said differential RF output signal.

* * * * *